United States Patent Office 3,773,733
Patented Nov. 20, 1973

3,773,733
METHOD OF POLYMERIZING ISOOLEFIN
Shunsuke Matsushima, Ibaraki, Japan, assignor to Sumitomo Chemical Company, Limited, Osaka, Japan
No Drawing. Filed Dec. 15, 1971, Ser. No. 208,397
Claims priority, application Japan, Dec. 29, 1970,
46/124,413
Int. Cl. C08d 1/16, 3/04; C08f 3/14
U.S. Cl. 260—85.3 R    13 Claims

ABSTRACT OF THE DISCLOSURE

A method for producing isoolefin homopolymers or copolymers is provided herein, which comprises polymerizing or copolymerizing an isoolefin, mixtures thereof, or a mixture of an isoolefin and multiolefin copolymerizable with an isoolefin in the presence of a catalyst system comprising (1) an aluminum-metal oxide-alkoxide compound represented by the general formula, $$M[OAl(OR)_2]_2$$

wherein M is a divalent metal atom, R is an alkyl radical having from 1 to 8 carbon atoms, an aryl radical having from 6 to 10 carbon atoms, an aralkyl radical having from 7 to 12 carbon atoms, a cycloalkyl radical having from 6 to 10 carbon atoms, or a halogenated substituent thereof, and wherein R is the same or a different radical, and (2) boron trifluoride. The present invention is also directed to the above catalyst system, per se, useful for producing isoolefin polymers. By the use of the above catalyst, it is possible to produce isoolefin polymers at higher temperatures than possible with previously known catalyst systems.

---

The present invention relates to a method of polymerizing an isoolefin. More particularly, the present invention relates to a method of producing isoolefin homopolymers or copolymers, namely butyl type rubbers, which comprises polymerizing or copolymerizing isoolefin, a mixture thereof, or a mixture of an isoolefin and a multiolefin in the presence of a particular catalyst system.

A number of catalyst systems for producing butyl type rubbers have hitherto been proposed. For example, metal halides of the Friedel-Crafts type catalyst have been proposed. Among these, a solution of aluminum chloride in methyl chloride or in ethyl chloride has been most frequently used for the production of butyl type rubbers. However, these catalysts require a temperature as low as about −100° C. Such a low temperature is not desirable from an industrial or economical point of view.

Thus, many attempts have been made to produce, at a relatively high temperature, isoolefin polymers of a high degree of polymerization suitable for practical use. For example, it is known to polymerize isobutylene in the presence of a catalyst system of Et$_2$AlCl-tert.-BuCl in a polar solvent such as methylene chloride (Japanese patent publication No. 2471/1969) or in the presence of a catalyst system of Al(O sec.-Butyl)$_3$BF$_3$-T$_1$Cl$_4$ (J. Polymer Sci., 53, 281).

It is an object of the present invention to provide a method of producing isoolefin homopolymers or copolymers having a high degree of polymerization.

Another object of the invention is to provide isobutylene homopolymers or copolymers having a high degree of polymerization.

Still another object of the invention is to provide a butyl type rubber of a high molecular weight, namely copolymers of an isoolefin such as isobutylene and a multiolefin copolymerizable therewith such as isoprene at a considerably higher temperature than that which has been possible hitherto.

Other objects and advantages will be apparent from the following description.

The present inventor has now found that the use of a catalyst system comprising (1) an aluminum-metal oxide-alkoxide compound and (2) boron trifluoride is effective for producing isoolefin homopolymers or copolymers having a high molecular weight at a comparatively higher temperature than that used when a Friedel-Crafts type catalyst such as boron trifluoride or aluminum chloride is singly employed.

The present invention is based on the above discovery. Thus, the method of this invention comprises polymerizing or copolymerizing an isoolefin, a mixture thereof, or a mixture of an isoolefin and a multiolefin copolymerizable therewith in the presence of a catalyst system comprising (1) an aluminum-metal oxide-alkoxide compound represented by the general formula, $$M[OAl(OR)_2]_2$$

wherein M is a divalent metal atom, R is an alkyl radical having from 1 to 8 carbon atoms, an aryl radical having from 6 to 10 carbon atoms, an aralkyl radical having from 7 to 12 carbon atoms, a cycloalkyl radical having from 6 to 10 carbon atoms, or a halogenated substitute thereof, and R's may be the same or different, and (2) boron trifluoride.

The divalent metal in the above described formula is Mg, Ba, Ca, Cd, Cr(II), Mn(II), Fe(II), Co(II), Ni(II) and the like, and R is methyl, ethyl, propyl, isopropyl N-butyl, iso-butyl, sec-butyl, n-amyl, tert.-amyl, n-hexyl, n-heptyl, 2-ethylhexyl, 2-chloroethyl, cyclopentyl, cyclo-hexyl, phenyl, methylphenyl, cresyl, 2-chlorophenyl and the like.

Representative examples of the aluminum-metal oxide-alkoxide compounds having the above indicated formula are Zn[OAl(OEt)$_2$]$_2$, Zn[OAl(Oiso-Pr)$_2$]$_2$,
Zn[OAl(Oiso-Pr)(OEt)]$_2$, Zn[OAl(On-Bu)$_2$]$_2$,
Ba[OAl(OEt)$_2$]$_2$, Ba[OAln-Bu)$_2$]$_2$,
Mn[OAl(On-Am)$_2$]$_2$ and Cd[OAl(OEt)$_2$]$_2$ These compounds, when used alone, have no catalytic activity to polymerize isobutylene, but when used in combination with boron trifluoride, exhibit a catalytic activity quite different from the known Friedel-Crafts type catalyst, and are effective in the production of polymers of a high degree of polymerization even at a comparatively high temperature.

These compounds are known as catalysts invented by I. F. P. (Institut Francais de Petrole) to give high polymers of propylene oxide, and are described by M. Osagan, Ph. Heyssie and J. P. Wauqiur in the collection of preliminary reports of Am. Chem. Soc. at Atlantic City Meeting (Sept. 8–13, 1968). The method for synthesizing these compounds is also described in this report. These compounds can be easily synthesized by the reaction of an acetate of a divalent metal with aluminum alkoxide. This reaction can be represented, for example, by the following reaction formula:

Zn(OCOCH$_3$) + 2Al(O iso-Pr)$_3$ ⟶
    Zn[OAl(O iso-Pr)$_2$]$_2$ + CH$_3$COO isoPr These compounds are easily soluble in inert organic solvents such as saturated hydrocarbons (for example, n-hexane, n-heptane and the like), and halogenated hydrocarbons (for example, methyl chloride, ethyl chloride and the like), and therefore they are convenient for use in polymerization systems. In the polymerization, even by the further addition of boron trifluoride to the polymerization system, they do not form a precipitate, nor do they cause uneven polymerization, and the catalysts may be advantageously separated after the polymerization.

The isoolefins to be used in the present invention are those having from 4 to 8 carbon atoms. Representative examples of these compounds include isobutylene, 2-methyl-1-butene, 3-methyl-1-butene, 2 - methyl - 2 - butene, 4-methyl-1-pentene and a mixture of two or more of them. Further cationic polymerizable compound (for example, styrene, α-methylstyrene and the like) can also be used as isoolefins.

The multiolefins copolymerizable with the above described isoolefins and to be used in the present invention are those having from 4 to 14 carbon atoms. Representative examples of these compounds include isoprene, 1,3-butadiene, 2,3-dimethyl - 1,3 - butadiene, 6,6-dimethylfulvene, piperylene, cyclopentadiene, dicyclopentadiene, divinylbenzene, cyclohexadiene, vinylcyclohexene, and the like.

According to the present invention, butyl type rubbery polymers can be obtained by copolymerizing an isoolefin as a major part of the total compounds used, for example in an amount of from about 70 to 99.5% by weight, preferably from 85 to 99.5% by weight with a multiolefin as a minor part, for example in an amount of from about 30 to 0.5% by weight, preferably from 15 to 0.5% by weight. Particularly preferred polymers are obtained by copolymerizing from 95 to 99.5% by weight of isobutylene with from 5 to 0.5% by weight of isoprene.

Isoolefins, even in their single use, can be polymerized to produce useful polymers. For example isobutylene, when polymerized singly, forms polyisobutylene of a high degree of polymerization. Isoolefins may be also co-polymerized with other polymerizable monoolefins such as styrene.

Further, by the use of the catalyst system of the present invention, useful and low molecular weight polymer can be obtained if desired. Thus, when a considerable amount of multiolefin, for example 30 to 5% by weight of isoprene, is copolymerized with isoolefin, for example 70 to 95% by weight of isobutylene, at any desired temperature, butyl rubbers having a low, number average molecular weight of 1,000 to 50,000 may be produced in syrup- or grease-like form. As they have a narrow width of molecular weight distribution, they are low in spinnability and are therefore easy for processing into elastic sealants with or without the dilution in a solvent. After the vulcanization they give a high strength. This seems to be due to comparatively uniform length of the molecule.

The polymerization is generally conducted in an inert solvent so as to facilitate the operation. Any type of solvent which is inert under the polymerization conditions can be used. Examples of such solvents are conventional halogenated hydrocarbons (for example, methyl chloride, ethyl chloride, chlorobenzene, methyl bromide and carbon tetrachloride), carbon disulfide, saturated hydrocarbons (for example, n-hexane, n-heptane and the like), unsaturated hydrocarbons (for example, ethylene, propylene and the like), aromatic hydrocarbons (for example, benzene, toluene and the like) and mixtures thereof. The amount of the catalyst to be used in the present invention may range from 2 to 0.001% by mole, preferably from 1 to 0.01% by mole for the aluminum-metal oxide-alkoxide compound and from 10 to 0.001% by mole, preferably from 5 to 0.02% by mole, for boron trifluoride, based on the starting material.

For carrying out smoothly the method of the present invention, either the bulk or solution polymerization can be selected, and the polymerization may be conducted batchwise or continuously.

When polymerizing by using the catalyst system of the present invention, the polymerization can be accelerated or controlled by the presence of a polar substance such as, water, alcohols, organic carboxylic acids, etc. Such has been well known for the Friedel-Crafts type catalysts and this is also the case for the catalytic system of this invention.

The polymerization temperature to be used in the polymerization system of the present invention is generally below about 0° C. A dominant characteristic of the present invention consists in that the catalyst system of the invention provides high molecular polymers at a higher temperature than that used in the case of the conventional Friedel-Crafts type catalysts, but by lowering the polymerization temperature it is possible to increase the degree of polymerization further. Thus, the temperature can be suitably selected over a wide range according to the desired molecular weight of the polymer.

To illustrate the method of the present invention, the following examples are given but it is not intended to limit the scope of the present invention thereby.

EXAMPLES 1–5 AND COMPARATIVE EXAMPLE 1

To a 300 ml. flask, 33.7 g. isobutylene and 150 ml. n-heptane were charged. Further, 0.5 millimole of aluminum-metal oxide-alkoxide of the general formula $$M[OAl(OR)_2]_2$$

was added. Then, an amount of boron trifluoride as shown in Table 1 was introduced into the upper space of the flask while being stirred and cooled. After polymerization for one hour, ethanol was added to stop the reaction. On freeze-drying the thus-obtained polymer for one day, a white rubbery polymer was obtained. The results are shown in Table 1 together with the result obtained in Comparative Example 1 in which an aluminum-metal oxide-alkoxide was not added.

TABLE 1

|  | Example | | | | | Comp. Ex. 1 |
|---|---|---|---|---|---|---|
|  | 1 | 2 | 3 | 4 | 5 |  |
| Aluminum-metal oxide-alkoxide [1] (0.5 millimole) | A | B | C | D | E | ------ |
| BF₃ (millimole) | 5.3 | 6.8 | 5.5 | 6.2 | 6.5 | 4.0 |
| Polymerization temperature (° C.) | −65 | −65 | −65 | −65 | −65 | −65 |
| Yield (g.) | 29.5 | 26.5 | 31.0 | 25.0 | 23.2 | 23.1 |
| Viscosity average molecular weight (thousand) | 1210 | 950 | 1100 | 800 | 750 | 95 |

[1] See the following:
A = Zn[OAl(O iso-Pr)₂]₂
B = Zn[OAl(O iso-Pr)(O Et)]₂
C = Mn[OAl(O n-Am)₂]₂
D = Ba[OAl(O n-Bu)₂]₂
E = Cd[OAl(O Et)₂]₂

EXAMPLES 6–8 AND COMPARATIVE EXAMPLE 2

To a 300 ml. of flask, 33.7 g. isobutylene, 0.68 g. isoprene and 150 ml. n-heptane were charged. Further, 0.5 ml. of an aluminum-metal oxide-alkoxide of the general formula $M[OAl(OR)_2]_2$ was added and then cooled to a temperature of −65° C. While being stirred this reaction liquid, BF₃ was introduced into the upper space of the flask. After polymerization for one hour, ethanol was added to stop the reaction. On freeze-drying the thus obtained polymer for one day, a rubbery polymer was obtained. These results are shown in Table 2 together with the result in Comparative Example 2 in which an aluminum-metal oxide-alkoxide was not added.

TABLE 2

|  | Example | | | Comp. Ex. 2 |
|---|---|---|---|---|
|  | 6 | 7 | 8 |  |
| Aluminum-metal oxide-alkoxide [1] (0.5 milimole) | A | B | C | ------ |
| BF₃ (millimole) | 3.5 | 4.5 | 3.0 | 4.0 |
| Polymerization temperature (° C.) | −65 | −65 | −65 | −65 |
| Yield (g.) | 31.5 | 31.2 | 27.8 | 23.5 |
| Viscosity average molecular weight (thousand) | 530 | 320 | 430 | 12 |
| Double bond content (isoprene mole percent) | 1.10 | 1.03 | 1.23 | 1.20 |

[1] See the following:
A = Zn[OAl(O n-Bu)₂]₂
B = Ba[OAl(O Et)₂]₂
C = Zn[OAl(O iso-Pr)₂]₂

EXAMPLES 9–10 AND COMPARATIVE EXAMPLE 3

To a 300 ml. flask, 33.7 g. isobutylene, 0.68 g. isoprene and 150 ml. methyl chloride were charged. Further, 0.5 millimole of aluminum-metal oxide-alkoxide was added, and an amount of $BF_3$ as shown in Table 3 was introduced into the upper space of the flask while being stirred and cooled. After polymerization for one hour, ethanol was added to stop the reaction. On freeze-drying the thus obtained polymer, a white rubbery polymer was obtained. These results are shown in Table 3 together with the result of Comparative Example 3 in which aluminum-metal oxide-alkoxide was not added.

TABLE 3

| | Example | | Comp. Ex. 3 |
|---|---|---|---|
| | 9 | 10 | |
| Aluminum-metal oxide-alkoxide (0.5 millimole) | $Zn[OAl(O\ iso\text{-}Pr)_2]_2$ | $Zn[OAl(O\ Et)_2]_2$ | |
| $BF_3$ (millimole) | 3.2 | 4.3 | 4.0 |
| Polymerization temperature (° C.) | −75 | −75 | −75 |
| Yield (g.) | 28.1 | 30.1 | 30.2 |
| Viscosity average molecular weight (thousand) | 720 | 650 | 98 |
| Double bond content (isoprene mole percent) | 1.15 | 1.21 | 1.23 |

It would be apparent from Examples 1 to 10 that according to the method of the present invention polymers of higher molecular weight than those obtained in Comparative Examples 1 to 3 in which $BF_3$ catalyst was used singly can be obtained.

EXAMPLES 11 AND 12

To a 300 ml. flask, predetermined amounts of 2-methylbutene-1 or 2-methylbutene-1 and isoprene as shown in Table 4 were charged, and 150 ml. methyl chloride was added. Then, 0.5 millimole of $Zn[OAl(O\ iso\text{-}Pr)_2]_2$ was added and a predetermined amount of $BF_3$ as shown in Table 4 was introduced into the upper space of the flask while being stirred and cooled. After polymerization for one hour, isopropyl alcohol was added to stop the reaction. The thus-obtained polymer was dissolved in benzene, and on freeze-drying for one day a white polymer was obtained. The results are shown in Table 4.

TABLE 4

| | Example | |
|---|---|---|
| | 11 | 12 |
| $BF_3$ (millimole) | 4.1 | 4.5 |
| 2-methylbutene-1 (g.) | 30.1 | 30.1 |
| Isoprene (g.) | | 6.0 |
| Polymerization temperature (° C.) | −45 | −45 |
| Viscosity average molecular weight (thousand) | 210 | 100 |
| Double bond content (isoprene mole percent) | | 0.6 |

EXAMPLE 13

To a 300 ml. flask, 33.7 g. isobutylene and 2.55 g. isoprene was charged, to which 150 ml. n-heptane and then 0.5 millimole $Zn[OAl(O\ iso\text{-}Pr)_2]_2$ were added. After cooling the mixture to −75° C., while being stirred, 9 millimoles of $BF_3$ was added. After polymerization for two hours methanol was added to stop the reaction. On drying under reduced pressure at 55° C., 31.5 g. of a semi-fluid polymer was obtained. The double bond content was 4.2 isoprene mole percent, the viscosity average molecular weight 28,000 and the molecular weight distribution coefficient (weight average molecular weight/number average molecular weight) 3.5.

When polymerization in this example was carried out without $Zn[OAl(O\ iso\text{-}Pr)_2]_2$ and with only $BF_3$, the yield of the polymer was 29.5 g. the viscosity average molecular weight 8,000 and the molecular weight distribution coefficient 10.3.

What is claimed is:

1. A method for producing isoolefin homopolymers or copolymers, which comprises polymerizing or copolymerizing an isoolefin, a mixture of isoolefins, or a mixture of an isoolefin and a diolefin copolymerizable with isoolefin in the presence of a catalyst system comprising (1) an aluminum-metal oxide-alkoxide compound represented by the general formula, $M[OAl(OR)_2]_2$, wherein M is a divalent metal atom, R is an alkyl radical having from 1 to 8 carbon atoms, an aryl radical having from 6 to 10 carbon atoms, an aralkyl radical having from 7 to 12 carbon atoms, a cycloalkyl radical having from 6 to 10 carbon atoms, or a halogenated substitute thereof, and is the same or a different radical, and (2) boron trifluoride.

2. A method according to claim 1 wherein the isoolefin is a member selected from the group consisting of isobutylene, 2-methyl-1-butene, 3-methyl-1-butene, 2-methyl-2-butene, 4-methyl-1-pentene and a mixture thereof.

3. A method according to claim 1 wherein the diolefin is a member selected from the group consisting of isoprene, 1,3-butadiene, 2,3-dimethyl-1,3-butadiene, 6,6-dimethylfulvene, piperylene, cyclopentadiene, dicyclopentadiene, divinylbenzene, cyclohexadiene and vinylcyclohexene.

4. A method according to claim 1 wherein the isoolefin copolymers are obtained by copolymerizing from 70 to 99.5% by weight of the isoolefin with from 30 to 0.5% by weight of the diolefin.

5. A method according to claim 1 wherein the isoolefin copolymers are obtained by copolymerizing from 95 to 99.5% by weight of isobutylene with from 5 to 0.5% by weight of isoprene.

6. A method according to claim 1 wherein the aluminum-metal oxide-alkoxide compound is a member selected from the group consisting of $Zn[OAl(O\ Et)_2]_2$, $Zn[OAl(O\ iso\text{-}Pr)_2]_2$, $Zn[OAl(O\ iso\text{-}Pr)(O\ Et)_2]_2$, $Zn[OAl(O\ n\text{-}Bu)_2]_2$, $Ba[OAl(O\ Et)_2]_2$, $Ba[OAl(O\ n\text{-}Bu)_2]_2$, $Mn[OAl(O\ n\text{-}Am)_2]_2$ and $Cd[OAl(O\ Et)_2]_2$.

7. A method according to claim 1 wherein the divalent metal atom is a member selected from the group consisting of Mg, Ba, Ca, Cd, Cr(III), Mn(II), Fe(II), Co(II) and Ni(II).

8. A method according to claim 1 wherein the aluminum-metal oxide-alkoxide compound is used from 2 to 0.001% by mole based on the isoolefin.

9. A method according to claim 1 wherein the boron tri-fluoride is used from 10 to 0.001% by mole based on the aluminum-metal oxide-alkoxide compound.

10. A method according to claim 1 wherein the polymerization or copolymerization is carried out in the presence of a solvent.

11. A method according to claim 10 wherein the solvent is a member selected from the group consisting of methyl chloride, ethyl chloride, chlorobenzene, methyl bromide, carbon tetrachloride, carbon disulfide, n-hexane, n-heptane, ethylene, propylene, benzene, and toluene.

12. A method according to claim 1 wherein the polymerization or copolymerization is carried out at a temperature below 0° C.

13. A catalyst comprising (1) an aluminum-metal oxide-alkoxide compound represented by the general formula, $M[OAl(OR)_2]_2$, wherein M is a divalent metal atom, R is an alkyl radical having from 1 to 8 carbon atoms, an aryl radical having from 6 to 10 carbon atoms, an aralkyl radical having from 7 to 12 carbon atoms, a cycloalkyl radical having from 6 to 10 carbon atoms, or a halogenated substitute thereof, and is the same or a different radical, and (2) boron trifluoride.

References Cited

UNITED STATES PATENTS 3,493,549 2/1970 Uemura et al. ----- 260—85.3 R
3,306,923 2/1967 Wetroff et al. ---- 260—448 AD

FOREIGN PATENTS 1,246,620 10/1960 France --------- 260—448 AD

JOSEPH L. SCHOFER, Primary Examiner
A. HOLLER, Assistant Examiner

U.S. Cl. X.R.

252—431 R, 433; 260—88.2 E, 93.7, 94.8, 448